March 26, 1940.  H. MIZUGOSHI  2,194,865
METHOD OF PRODUCING A NET OF SQUARE MESHES
Filed Dec. 16, 1938

INVENTOR
Hikoichiro Mizugoshi
BY
Watson, Cole, Grindle & Watson
ATTORNEYS

Patented Mar. 26, 1940

2,194,865

UNITED STATES PATENT OFFICE 2,194,865

METHOD OF PRODUCING A NET OF SQUARE MESHES

Hikoichiro Mizugoshi, Tokyo, Japan

Application December 16, 1938, Serial No. 246,230
In Japan April 24, 1937

5 Claims. (Cl. 96—23)

This invention relates to a method of producing a net of square meshes, and has for its object the production of a net of square meshes wherein whenever a greater effect of pulling or tensioning forces is applied on the warps or the wefts of the net or on the both thereof the more strongly the knots of the net are tied up so that the shifting or the loosening of any knot of the net can be effectively prevented and also the net in this invention can be very easily made.

This invention consists of a method of producing a net of square meshes comprising the steps of forming a series of loops in a single turn located at regular intervals on each of a number of warps which are arranged in parallel one by one at regular intervals; of inserting each of a number of wefts successively into the loops in the same course on the warps so as to wind the respective weft once around the doubled portion of each of the loops placing the doubled portion of each of the loops on the wefts inside the loop on the respective warp; and of tensioning the warps and the wefts tightly lengthwise and crosswise so as to tie up the knots of the net formed by the engagement of the looped portions of the warps and the wefts.

This invention will be best understood by reference to the accompanying drawing showing three forms of nets produced by carrying out the method of the present invention.

Figure 1:
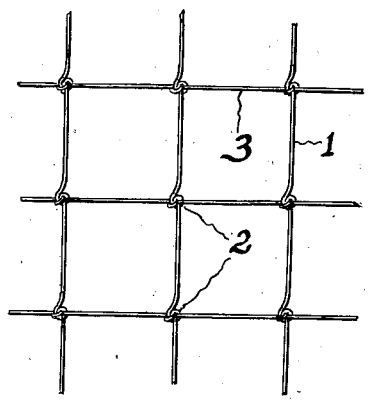
Figure 1 is a front view of a part of a net of square meshes produced according to this invention.
Figure 2:
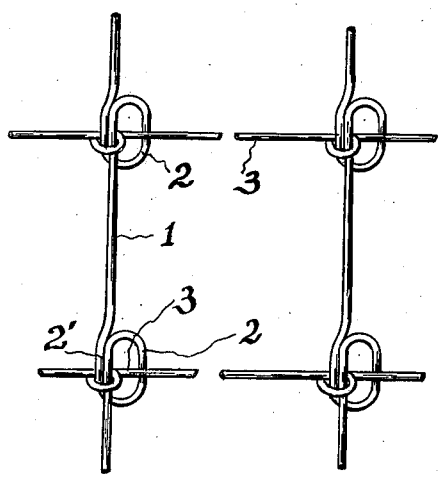
Figure 2 is an enlarged front view of a part of the net and showing the structure of the knots.

Referring to Figures 1 and 2, a number of warps 1 are arranged in parallel at regular intervals and each of said warps is looped so as to produce a series of loops in a single turn at regular intervals along the lengthwise thereof. Into each of the loops 2 in the same course each one of wefts 3 is inserted so as to wind it one time around the doubled portion 2' of the loops on the warps placing the doubled portion of each of the loops on the wefts inside the loop on the respective warp. Then the warps and the wefts are tightly tensioned so as to tie up the knots formed by the warps and the wefts. The procedure as above described is repeatedly operated to all other warps and wefts, thus a novel net of square meshes having strongly tightened and firmly fixed knots can be produced very easily.

Figure 3:
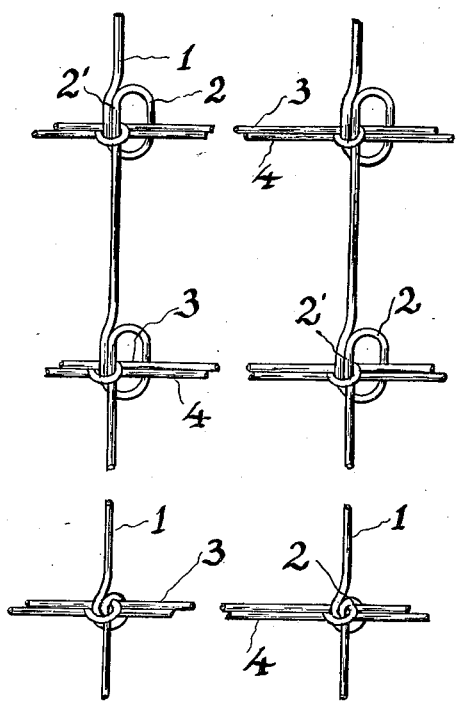
Figure 3 is a similar view to Figure 2 of a modified form of a net.

In Figure 3, an auxiliary thread 4 for reinforcements is added to the weft by passing through the loops of the warps arranged in parallel at regular intervals, said loops of the warps being lined horizontally in the respective course of the wefts. Said auxiliary thread is juxtaposed practically in contact with the weft so as to remain substantially straight along the whole length of the weft after the all wefts have been wound one time around each of the doubled portions of the loops. The net is finished in the same manner as above described in connection with that of Figures 1 and 2 when the warps and the wefts are tensioned tightly lengthwise and crosswise. Such reinforcing thread, if desired, may be combined with each or some of the wefts.

Figure 4:
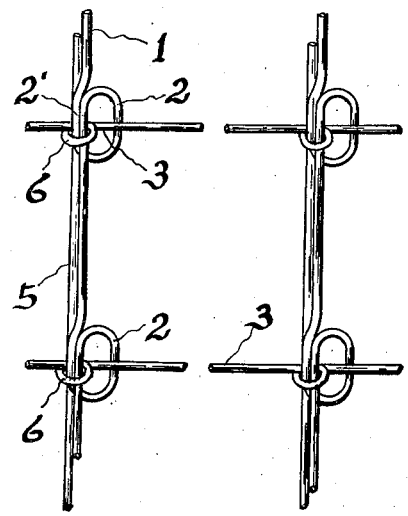
Figure 4 is a similar view to Figure 2 of a further modified form of a net produced according to this invention.

In Figure 4, an auxiliary thread 5 for reinforcements is placed parallel to the warp 1 along the doubled portions of the loops thereof so as to be wound by the loops 6 of the wefts inserted at a right angle to the warps. Said auxiliary thread is juxtaposed practically in contact with the warp so as to remain substantially straight along the whole length of the warp after the doubled portions of the loops have been wound one time by the weft. The net is finished in the same manner as above described. Such reinforcing thread, if desired, may be combined with each or some of the warps.

Also, the auxiliary reinforcing threads may be adopted for both the weft and warp in a similar manner as above described if desired.

According to the present invention, a net of square meshes can be produced very easily and the point of every knot is tightly united to each other by the loops of the warp and weft as mentioned heretofore so that even when the pulling or tensioning forces are applied to the net in all directions none of the knots is affected thereby and on the contrary they are fixed tightly so much the more. Consequently, the shifting or the loosening of the knots of the net is substantially prevented.

In this invention, cotton or linen yarns or threads or metallic wires, etc. may be used as the material of the warp or the weft. The net manufactured according to this invention is specially useful where the shifting or the loosening of the knots of the net is extremely objectionable, for example as in tennis-nets or some kind of drag-nets.

I claim:

1. A method of producing a net of square meshes comprising the steps of forming a series of loops in a single turn located at regular intervals on each of a number of warps which are arranged in parallel one by one at regular intervals; of inserting each of a number of wefts successively into the loops in the same course on the warps so as to wind the respective weft once around the doubled portion of each of the loops placing the doubled portion of each of the loops on the wefts inside the loop on the respective warp; and of tensioning the warps and the wefts tightly lengthwise and crosswise so as to tie up the knots of the net formed by the engagement of the looped portions of the warps and the wefts.

2. A method of producing a net of square meshes comprising the steps of forming a series of loops in a single turn located at regular intervals on each of a number of warps which are arranged in parallel one by one at regular intervals; of inserting each of a number of wefts successively into the loops in the same course so as to wind the respective weft around the doubled portion of each of the loops; of adding an auxiliary thread for reinforcements to the weft by passing through the loops in the same course; and of tensioning the warps, wefts and auxiliary threads tightly lengthwise and crosswise so as to tie up the knots of the net formed by the engagement of the looped portions of the warps and the wefts, said auxiliary thread being juxtaposed practically in contact with the weft so as to remain substantially straight along the whole length of the weft after the tieing up operation of the knots has been finished.

3. A method of producing a net of square meshes comprising the steps of forming a series of loops in a single turn located at regular intervals on each of a number of warps which are arranged in parallel one by one at regular intervals; of adding an auxiliary thread for reinforcements in parallel to each of the warps stretching along the doubled portions of the loops; of inserting each of a number of wefts successively into the loops in the same course so as to wind the respective weft around the auxiliary thread and doubled portion of each of the loops; and of tensioning the warps, wefts and auxiliary threads tightly lengthwise and crosswise so as to tie up the knots of the net formed by the engagement of the looped portions of the warps and the wefts, said auxiliary thread being juxtaposed practically in contact with the warp so as to remain substantially straight along the whole length of the warp after the tieing up operation of the knots has been finished.

4. A method of producing a net of square meshes comprising the steps of forming a series of loops in a single turn located at regular intervals on each of a number of warps which are arranged in parallel one by one at regular intervals, inserting each of a number of wefts successively into the loops in the same course so as to wind the respective weft once around the doubled portion of each of the loops, placing the doubled portion of each of the loops on the wefts inside the loop on the respective warp, adding an auxiliary thread for reinforcement to the weft by passing through the loops in the same course, and tensioning the warps, wefts and auxiliary threads tightly lengthwise and crosswise so as to tie up the knots of the net formed by the engagement of the looped portions of the warps and the wefts, said auxiliary thread being juxtaposed practically in contact with the weft so as to remain substantially straight along the whole length of the weft after the tying up operation of the knots has been finished.

5. The method of producing a net of square meshes comprising the steps of forming a series of loops in a single turn located at regular intervals on each of a number of warps which are arranged in parallel one by one at regular intervals, adding an auxiliary thread for reinforcement parallel to each of the warps and stretching along the doubled portions of the loops, inserting each of a number of wefts successively into the loops in the same course so as to wind the respective weft once around the auxiliary thread and doubled portion of each of the loops, placing the doubled portion of each of the loops on the wefts inside the loop on the respective warp, and tensioning the warps, wefts and auxiliary threads tightly lengthwise and crosswise so as to tie up the knots of the net formed by the engagement of the looped portions of the warps and the wefts, said auxiliary thread being juxtaposed practically in contact with the warp so as to remain substantially straight along the whole length of the warp after the tying up operation of the knots has been finished.

HIKOICHIRO MIZUGOSHI.